(12) United States Patent
Chen et al.

(10) Patent No.: US 10,229,643 B2
(45) Date of Patent: Mar. 12, 2019

(54) LIQUID CRYSTAL DISPLAY PANEL COMPENSATING SUB PIXEL CHARGING RATE

(71) Applicant: SHENZHEN CHINA STAR OPTOELECTRONICS TECHNOLOGY CO., LTD., Shenzhen (CN)

(72) Inventors: Caiqin Chen, Shenzhen (CN); Je Hao Hsu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/416,646

(22) PCT Filed: Dec. 30, 2014

(86) PCT No.: PCT/CN2014/095587
§ 371 (c)(1),
(2) Date: Apr. 20, 2016

(87) PCT Pub. No.: WO2016/095279
PCT Pub. Date: Jun. 23, 2016

(65) Prior Publication Data
US 2016/0365046 A1    Dec. 15, 2016

(30) Foreign Application Priority Data
Dec. 16, 2014    (CN) .......................... 2014 1 0784300

(51) Int. Cl.
*G09G 3/36* (2006.01)
*G02F 1/1362* (2006.01)

(52) U.S. Cl.
CPC ......... *G09G 3/3614* (2013.01); *G02F 1/1362* (2013.01); *G09G 3/3648* (2013.01);
(Continued)

(58) Field of Classification Search
CPC ...... G09G 3/36; G09G 3/3611; G09G 3/3614; G09G 3/364; G09G 3/3655; G09G 3/3685; G09G 3/3648; G09G 3/3677; G09G 3/3688; G09G 2320/0219; G09G 2320/0223; G09G 2320/0233
(Continued)

(56) References Cited

U.S. PATENT DOCUMENTS 9,952,477 B2 * 4/2018 Chen .................... G09G 3/3648
2001/0028337 A1 * 10/2001 Wu ...................... G09G 3/3677
345/100

(Continued)

*Primary Examiner* — Alexander Eisen
*Assistant Examiner* — Nelson Lam
(74) *Attorney, Agent, or Firm* — Andrew C. Cheng (57) ABSTRACT

A liquid crystal display panel is provided, comprising a plurality of sub pixels arranged in a pixel array, which is formed by a plurality of data lines and a plurality of scan lines perpendicular to each other. The plurality of scan lines comprises a first scan line connected with a first sub pixel, the first scan line being enabled within a first time period after a polarity inversion of a drive signal level of a data line, and at least one second scan line being enabled within a second time period after the first time period. An RC delay of the second scan line is larger than that of the first scan line.

7 Claims, 8 Drawing Sheets

(52) U.S. Cl.
CPC ......... *G09G 3/3677* (2013.01); *G09G 3/3688* (2013.01); *G02F 1/136286* (2013.01); *G09G 2300/0426* (2013.01); *G09G 2300/0452* (2013.01); *G09G 2310/0251* (2013.01); *G09G 2310/06* (2013.01); *G09G 2310/067* (2013.01); *G09G 2320/0219* (2013.01); *G09G 2320/0223* (2013.01); *G09G 2320/0233* (2013.01); *G09G 2330/021* (2013.01)

(58) Field of Classification Search
USPC .................................................. 345/87–104
See application file for complete search history.

(56) References Cited

U.S. PATENT DOCUMENTS

| | | | | |
|---|---|---|---|---|
| 2008/0191980 A1* | 8/2008 | Jeon | ............... | G09G 3/3677 345/87 |
| 2009/0102992 A1* | 4/2009 | Chung | ............... | G09G 3/3648 349/37 |
| 2009/0195489 A1* | 8/2009 | Hung | ............... | G02F 1/136286 345/92 |
| 2010/0245333 A1* | 9/2010 | Hsu | ............... | G09G 3/3648 345/213 |
| 2010/0301425 A1* | 12/2010 | Kang | ............... | H01L 21/823462 257/384 |
| 2011/0279443 A1* | 11/2011 | Chang | ............... | G09G 3/3614 345/214 |
| 2012/0162185 A1* | 6/2012 | Park | ............... | G09G 3/3611 345/212 |
| 2012/0249492 A1* | 10/2012 | Kim | ............... | G09G 3/3648 345/204 |
| 2014/0354616 A1* | 12/2014 | Liao | ............... | G09G 3/3696 345/212 |
| 2014/0375621 A1* | 12/2014 | Lee | ............... | G09G 3/003 345/212 |
| 2015/0185574 A1* | 7/2015 | Han | ............... | G02F 1/136286 349/43 |
| 2015/0220294 A1* | 8/2015 | Zheng | ............... | G09G 3/36 345/690 |
| 2015/0302816 A1* | 10/2015 | Won | ............... | G09G 3/3685 345/87 |
| 2016/0005367 A1* | 1/2016 | Yeo | ............... | G09G 3/3614 345/96 |
| 2016/0203753 A1* | 7/2016 | Hwang | ............... | G09G 3/2092 345/212 |
| 2016/0266444 A1* | 9/2016 | Zheng | ............... | G02F 1/13306 |
| 2016/0365066 A1* | 12/2016 | Lim | ............... | G09G 3/20 |
| 2016/0379579 A1* | 12/2016 | Cho | ............... | G09G 3/3275 345/214 |
| 2018/0197495 A1* | 7/2018 | Xu | ............... | H01L 27/12 |

* cited by examiner

LIQUID CRYSTAL DISPLAY PANEL COMPENSATING SUB PIXEL CHARGING RATE

CROSS REFERENCE TO RELATED APPLICATION

The present application claims benefit of Chinese patent application CN 201410784300.3, entitled "Liquid Crystal Display Panel" and filed on Dec. 16, 2014, which is incorporated herein by reference.

TECHNICAL FIELD

The present disclosure relates to the technical field of display, and in particular to a liquid crystal display panel.

TECHNICAL BACKGROUND

As liquid crystal display technology develops, most liquid crystal display devices at present have the advantages of low cost, low power consumption, and high performance. Elements in a liquid crystal display panel are usually integrated through precise design, so as to ensure an optimized display effect while lowering the cost and the power consumption.

In the field of thin film transistor liquid crystal display device (TFT-LCD), a large number of source drive circuits and gate drive circuits are required in a liquid crystal display panel for driving the pixels respectively arranged in a perpendicular direction and in a horizontal direction. As compared with a source drive chip, a gate drive chip has the advantages of lower cost and lower power consumption. In this case, the number of data lines can be reduced by designing a reasonable structure of the pixel array, and thus fewer source drive chips are needed, thereby the production cost and the power consumption of the liquid crystal display device can both be reduced.

For example, according to the prior art, two horizontally adjacent sub pixels in an HSD (Half Source Driving) pixel array share one data line, and thus the number of data lines can be reduced by half as compared with a traditional liquid crystal driving pixel array. Adjacent sub pixels in the same line are connected with different scan lines, and every other sub pixel is connected with the same scan line, and thus the number of scan lines doubles as compared with that of scan lines for driving a traditional pixel array.

Generally, in an HSD pixel array, 2H line inversion driving mode, i.e., two-line inversion driving mode, can be adopted. The polarity of the drive signal level of the data line inverses once within two scanning periods. As the number of scan lines doubles, the scanning time distributed to each of the scan lines is decreased, thereby the charging time of each sub pixel is reduced. Further, due to certain impedance of the data line, delay distortion will occur to the waveform of a voltage signal during the transmission thereof. The distortion becomes more and more severe as approaching the end of the data line. Consequently, the charging rate of the sub pixels in an odd numbered column at the end of the data line will be different from that of the sub pixels in an even numbered column at the end of the data line. For example, the sub pixels in the odd numbered column, which are driven first, are undercharged, and thus display relatively low brightness. In contrast, the sub pixels in the even numbered column, which are charged later, are better charged, and thus display relatively high brightness.

Therefore, in the same frame period, the brightness spatially displayed by the sub pixels of the liquid crystal display panel is not uniform, and thus bright lines and dark lines would appear over the entire HSD pixel array.

SUMMARY OF THE INVENTION

The technical problem to be solved by the present disclosure is to eliminate the defect of nonconformity of brightness spatially displayed on the liquid crystal display panel in the prior art.

In order to solve the above problem, a liquid crystal display panel according to an embodiment of the present disclosure is provided, comprising a plurality of sub pixels arranged in a pixel array, which is formed by a plurality of data lines and a plurality of scan lines that are perpendicular with respect to each other. The plurality of scan lines comprises a first scan line connected with a first sub pixel, the first scan line being enabled within a first time period after a polarity inversion of a drive signal level of a data line, so as to charge the first sub pixel through the data line, and at least one second scan line connected with at least one second sub pixel, the second scan line being enabled within a second time period after the first time period, so as to charge the second sub pixel through the data line. An RC delay of the second scan line is larger than that of the first scan line, so that a difference of charging rate of the data line to the first sub pixel from that of the data line to the second sub pixel can be compensated.

Preferably, a wiring resistance of the second scan line is larger than that of the first scan line.

Preferably, a thickness of the second scan line is the same as that of the first scan line, and a width of the second scan line is smaller than that of the first scan line.

Preferably, the data line is used for driving the first sub pixel and the at least one second sub pixel, and the drive signal level of the data line inverses periodically.

Preferably, one second scan line is provided, and the inversion period of the drive signal level of the data line equals to two scanning periods.

Preferably, two second scan lines are provided, and the inversion period of the drive signal level of the data line equals to three scanning periods.

Preferably, the first time period and the second time period after the inversion of the signal level of the data line both have the same time span, and the enabled time of the first scan line is the same as that of the at least one second scan line.

Preferably, a polarity of the drive signal level of the data line is the same in the first time period as in the second time period.

Preferably, a drive signal level of the second scan line and a drive signal level of the first scan line have the same value, so that a feed-through voltage of a pixel electrode of the first sub pixel is the same as that of a pixel electrode of the at least one second sub pixel.

Preferably, the pixel array is a half source driving pixel array or a tri-gate pixel array.

According to the present disclosure, different RC delays are configured for the scan lines of the liquid crystal display panel, so that the difference of charging rates of the data line to the sub pixels can be compensated. As a result, after charged by the data line, the sub pixels can obtain stable sustaining voltages of consistent value. Therefore, the sub pixels can display spatially uniform brightness, thereby the bright lines and dark lines on the display panel can be eliminated.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE ACCOMPANYING DRAWINGS

The accompanying drawings, which constitute a part of the description, are provided for further understanding the technical solution of the present disclosure and that of the prior art, they should not be construed as limitations thereto. In the drawings.

DETAILED DESCRIPTION OF THE EMBODIMENTS

In order to clarify the objective, technical solution and advantages of the present disclosure, the present disclosure will be further described in detail in view of the accompanying drawings. As long as there is no structural conflict, all the technical features mentioned in all the embodiments may be combined together in any manner, and the technical solutions obtained in this manner all fall within the scope of the present disclosure.

Example 1

Figure 1:
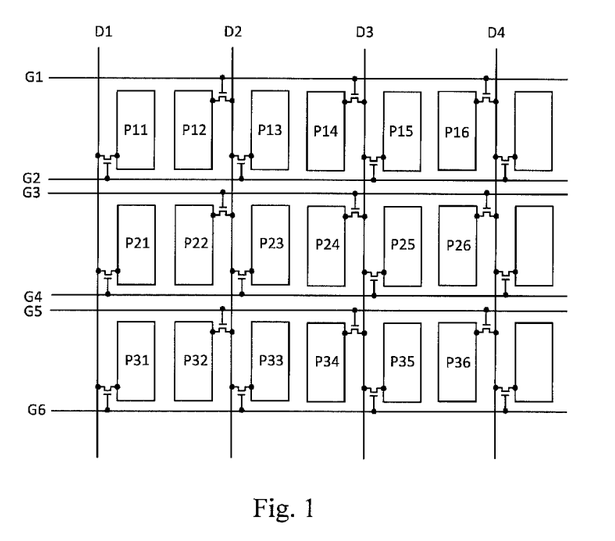
FIG. 1 schematically shows a structure of a half source driving liquid crystal display panel according to example 1 of the present disclosure.

FIG. 1 schematically shows a structure of an HSD (half source driving) liquid crystal display panel according to example 1 of the present disclosure. As shown in FIG. 1, the display panel comprises a pixel array formed by a plurality of data lines (such as data lines D1, D2, D3 and D4 in FIG. 1) and a plurality of scan lines (such as scan lines G1, G2, G3 and G4 in FIG. 1) perpendicular to each other, and a plurality of sub pixels P11-P36 disposed in the pixel array. For conciseness, a sub pixel arranged in the $x^{th}$ line and the $y^{th}$ column is defined as a sub pixel Pxy. For example, a sub pixel P12 is disposed in line 1 and column 2, and the other sub pixels are arranged in the same manner.

The sub pixel P12 is connected with a scan line G1 and a data line D2, and a sub pixel P13 is connected with a scan line G2 and the data line D2. P12 and P13 are respectively disposed on both sides of the data line D2. Similarly, a sub pixel P22 is connected with a scan line G3 and the data line D2, and a sub pixel P23 is connected with a scan line G4 and the data line D2. P22 and P23 are respectively disposed on both sides of the data line D2. Other sub pixels are arranged in the same manner.

According to the prior art, in the same frame period, the brightness spatially displayed by the sub pixels on the liquid crystal display panel is not uniform, and thus bright lines and dark lines along the perpendicular direction would appear over the entire HSD pixel array. The above defect is mainly caused by the following two reasons.

Figure 2:
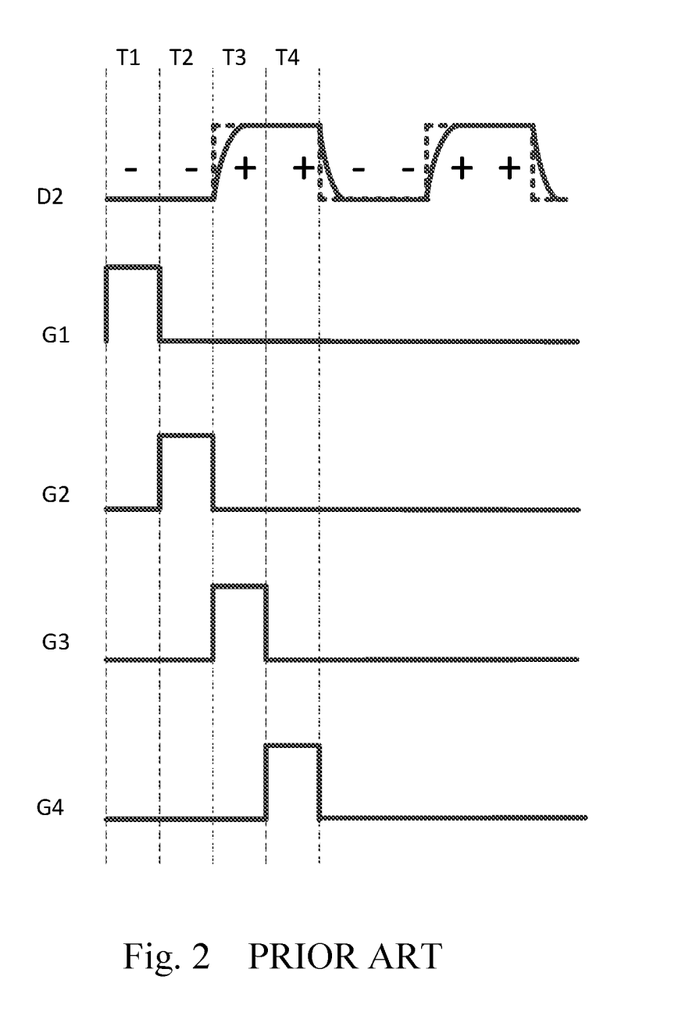
FIG. 2 shows a voltage oscillogram of drive signals of a scan line and a data line on an HSD panel in the prior art.

Firstly, due to the RC delay of a data line, the charging rates of sub pixels are different. The voltage oscillogram of drive signals of a scan line and a data line in a frame is as shown in FIG. 2. The drive signal level of the data line D2 inverses periodically. In the present example, a first time period after the polarity inversion is a scanning period T3, and a second time period thereafter is a scanning period T4. The data line D2 is used for driving a first sub pixel P22 and a second sub pixel P23. During the scanning period T3, a first scan line G3 is enabled, and the first sub pixel P22 is charged with a data signal voltage of positive polarity through the data line D2. Similarly, during the scanning period T4, a second scan line G4 is enabled, and the second sub pixel P23 is charged with a data signal voltage of positive polarity through the data line D2. As shown by the dashed lines in FIG. 2, due to the RC delay of the data line D2, in a time period at the beginning of the scanning period T3, a drive signal of the data line D2 cannot reach a pre-determined charging level, rendering the first sub pixel P22 undercharged. As a result, the sub pixel P22 displays relatively low brightness. However, during the scanning period T4, the drive signal of the data line D2 has reached the pre-determined level and become stable, and thus the second sub pixel P23 is fully charged, thereby displaying relatively high brightness.

Secondly, the inversion driving mode renders the charging rates of the sub pixels to be different. Generally, a 2H inversion driving mode, i.e., a two-line inversion driving mode, is applied in an HSD pixel array. The polarity of the drive signal of the data line inverses once within two scanning periods, i.e., the inversion period of the drive signal level of the data line is two scanning periods. As shown in FIG. 2, at the beginning of the scanning period T3, the drive signal level of the data line D2 experiences a polarity inversion, and jumps from a low level in the scanning period T2 to a high level in the scanning period T3. At this moment, because the drive signal of the data line D2 requires a significant change of voltage, the drive signal of the data line D2 cannot reach the predetermined charging level within a time period at the beginning of the scanning period T3, rendering the sub pixel P22 under charged. On the contrary, at the beginning of scanning period T4, the drive signal level of the data line D2 does not inverse. Thus, during scanning period T4, the drive signal of the data line D2 can be kept at a stable predetermined charging level, thereby the sub pixel P23 can be fully charged.

On the other hand, due to a parasitic capacitance between the sub pixels, a feed through voltage would be generated on an pixel electrode of a sub pixel at the very moment the scan line is disenabled, rendering a pixel electrode voltage to drop. The feed through voltage $\Delta Vp$ can be represented as the following equation:

$$\Delta Vp = (Vgh - Vgl) * Cgs/(Cst + Clc + Cgs)$$

In the above equation, Vgh is a high level of a drive voltage of the scan line, i.e., an enabling level; Vgl is a low level of a drive voltage of the scan line, i.e., a disenabling level; Cgs is a parasitic capacitance; Cst is a storage capacitance; and Clc is a liquid crystal capacitance.

Figure 3:
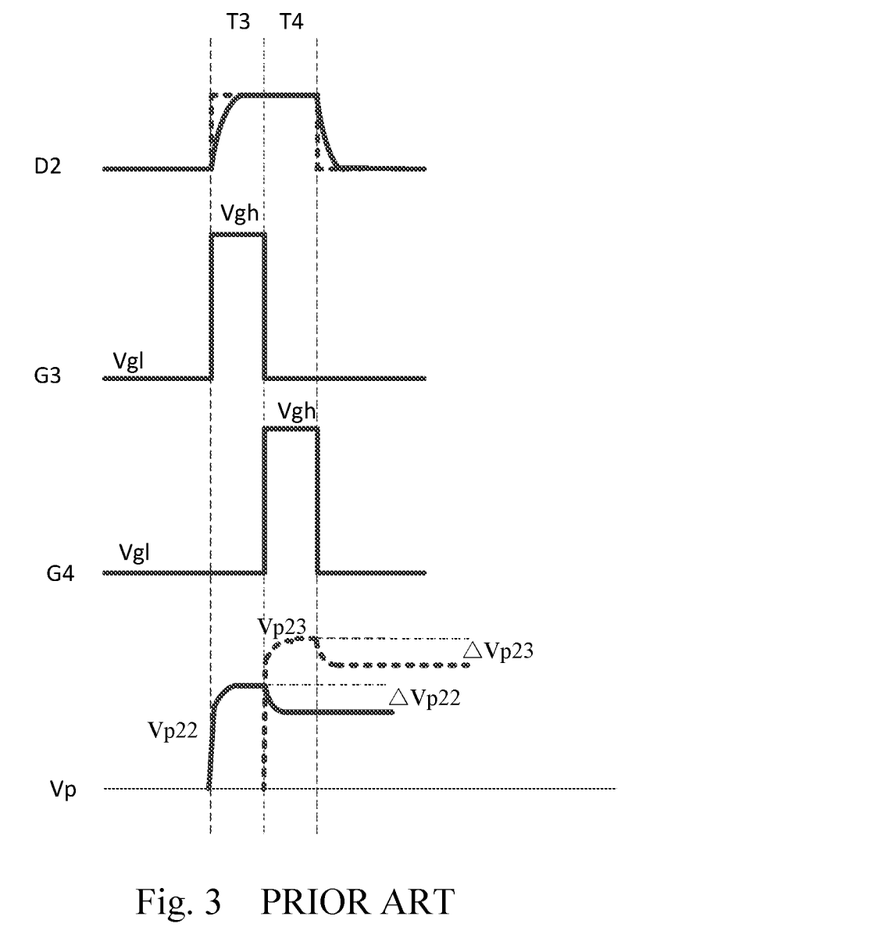
FIG. 3 shows an oscillogram illustrating changes of a pixel electrode voltage of a sub pixel on the HSD panel in the prior art.

Specifically, the waveform changes of the pixel electrode voltages respectively of the sub pixels P22 and P23 are as shown in FIG. 3.

At the beginning of the scanning period T3, the scan line G3 is enabled. The drive signal of the data line D2 cannot reach the predetermined charging level, and thus the charging rate of the data line D2 to the sub pixel P22 is relatively low. When the scanning period T3 ends, a pixel voltage Vp22 of the sub pixel P22 reaches the maximum value. After the scan line G3 is disenabled, a feed through voltage $\Delta$Vp22 enables the pixel voltage Vp22 to gradually decrease to a stable sustaining voltage.

At the beginning of the scanning period T4, the scan line G4 is enabled, and the drive signal of the data line D2 is kept at a stable predetermined charging level. The charging rate of the data line D2 to the sub pixel P23 is relatively high. When the scanning period T4 ends, the pixel voltage Vp22 of the sub pixel P23 reaches the maximum value, which is higher than the maximum value of the pixel voltage Vp22 of the sub pixel P22. After the scan line G4 is disenabled, a feed through voltage $\Delta$Vp23 enables a pixel voltage Vp23 to gradually decrease to a stable sustaining voltage. Because the drive signal level of the scan line G3 and that of the scan line G4 are completely the same, i.e., $\Delta$Vp23=$\Delta$Vp22, the sustaining voltage obtained by sub pixel P22 is smaller than that of sub pixel P23, rendering the sub pixel P22 to display relatively low brightness.

Based on the above analysis, different RC delays are configured for the scan lines according to the present example, so that the difference of charging rates of the data line to the sub pixels can be compensated, thereby the sustaining voltages obtained by the sub pixels after being charged can be the same. In this case, the sub pixels can display spatially uniform brightness, thereby the bright lines and dark lines on the HSD liquid crystal display panel can be eliminated.

As shown in FIG. 1, the RC delay of the second scan line G4 can be set as larger than that of the first scan line G3. Specifically, when the thickness of the scan line G4 is the same as that of the scan line G3, and the width of the scan line G4 can be smaller than that of the scan line G3, so that a wiring resistance of the scan line G4 is larger than that of the scan line G3.

Figure 4:
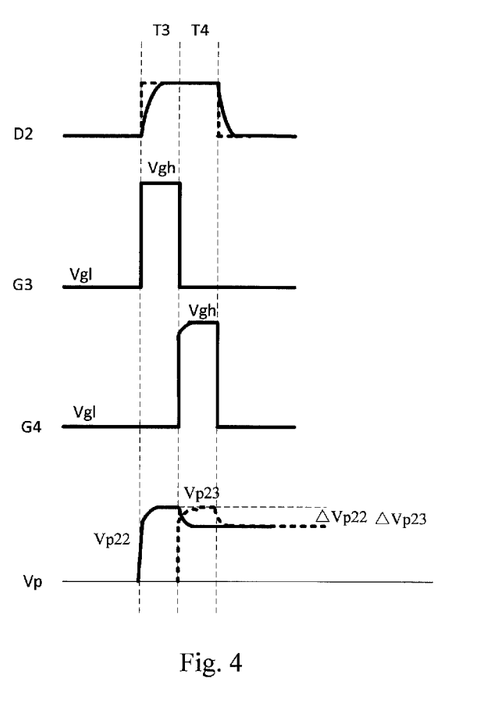
FIG. 4 shows an oscillogram illustrating changes of a pixel electrode voltage of a sub pixel after compensation by an RC delay of the scan line according to example 1 of the present disclosure, FIG. 5 schematically shows a structure of a tri-gate liquid crystal display panel according to example 2 of the present disclosure.

As a result, the waveform changes of the pixel electrode voltages respectively of the sub pixels P22 and P23 are as shown in FIG. 4.

At the beginning of the scanning period T3, the scan line G3 is enabled. The drive signal of the data line D2 cannot reach the predetermined charging level, and thus the charging rate of the data line D2 to the sub pixel P22 is relatively low. When the scanning period T3 ends, the pixel voltage Vp22 of the sub pixel P22 reaches the maximum value. After the scan line G3 is disenabled, the feed through voltage $\Delta$Vp22 enables the pixel voltage Vp22 to gradually decrease to a stable sustaining voltage.

As shown in FIG. 4, the polarity of the drive signal of the data line D2 is the same in the scanning period T3 as in the scanning period T4. At the beginning of the scanning period T4, the scan line G4 is enabled. The drive signal of the data line D2 is kept at a stable predetermined charging level. In the meantime, because the RC delay of the scan line G4 is larger than that of the scan line G3, the scan line G4 cannot be completely enabled. In this case, the maximum value Vgh of the scanning drive level actually exerted on the sub pixel P23 is smaller than the predetermined level, thereby the charging rate of the data line D2 to the sub pixel P23 is relatively low. When the scanning period T4 ends, the pixel voltage Vp23 of the sub pixel P23 reaches the maximum value.

It should be noted that the first time period T3 and the second time period T4 have the same time span, i.e., the enabled time of the scan line G3 is the same as that of the scan line G4. In addition, the drive signal level provided by the scan line G3 and that provided by the scan line G4 have the same value. Therefore, according to the present disclosure, good compatibility with the existing drive chip can be achieved without having to change the drive mode of the gate drive chip and that of the source drive chip in the prior art.

According to the example of the present disclosure, the difference between the charging rate of the data line D2 to the sub pixel P22 and that of the data line D2 to the sub pixel P23 in the prior art can be compensated through increasing the RC delay of the scan line G4 only, thereby the charging rate of sub pixel P22 and that of sub pixel P23 can be the same. In this case, at the time when the scan line G4 is disenabled, the maximum value of the pixel voltage Vp23 of the sub pixel P23 is the same as that of the pixel voltage Vp22 of the pixel voltage P22. After the scan line G4 is disenabled, the feed through voltage $\Delta$Vp23 enables the pixel voltage Vp23 to gradually decrease to the stable sustaining voltage.

Furthermore, the value of the drive signal level provided by scan line G3 is the same as that provided by the scan line G4, and thus the enabling level Vgh of G3 and that of G4 have the same value, and the disenabling level Vgl of G3 and that of G4 also have the same value. The level difference (Vgh−Vgl), which causes the feed through voltage, at the time when the scan line G4 is disenabled and that at the time when the scan line G3 is disenabled are completely the same, thereby the feed through voltage $\Delta$Vp23 equals to the feed through voltage $\Delta$Vp22. Therefore, the sustaining voltage obtained by the sub pixel P22 and that obtained by the sub pixel P23 are the same in value, thereby the sub pixel P22 and the sub pixel P23 can display the same brightness in the end.

It should be noted that the difference between the RC delay of the second scan line G4 and that of the first scan line G3 can be configured on account of the abovementioned two reasons for the dark lines and bright lines. That is, the relatively large RC delay of the scan line G4 is used to compensate the difference of charging rates of the sub pixels caused by the RC delay of the data line D2, as well as the difference of charging rates of the sub pixels caused by the 2H inversion drive mode.

In addition, according to the present example, proper difference between the RC delay of the scan line G4 and that of the scan line G3 is configured, so that the high level Vgh of the scanning drive signal actually provided to the sub pixel at the time when the scan line G4 is disenabled is completely the same as that at the time when the scan line G3 is disenabled, thereby ensuring that the feed through voltage $\Delta$Vp23 equals to the feed through voltage $\Delta$Vp22.

It is easy for one skilled in the art to understand that the 2H inversion drive mode can be applied to both an HSD liquid crystal display panel and a regular liquid crystal display panel. The odd numbered scan line and the even numbered scan line can have different wiring widths, so that the difference of charging rates of the data line to the sub pixels can be compensated. As a result, the final charging voltage of the sub pixels in the odd numbered column and that of the sub pixels in even numbered column can tend to be the same, thereby the dark lines and bright lines along the perpendicular direction can be eliminated.

Example 2

Figure 5:
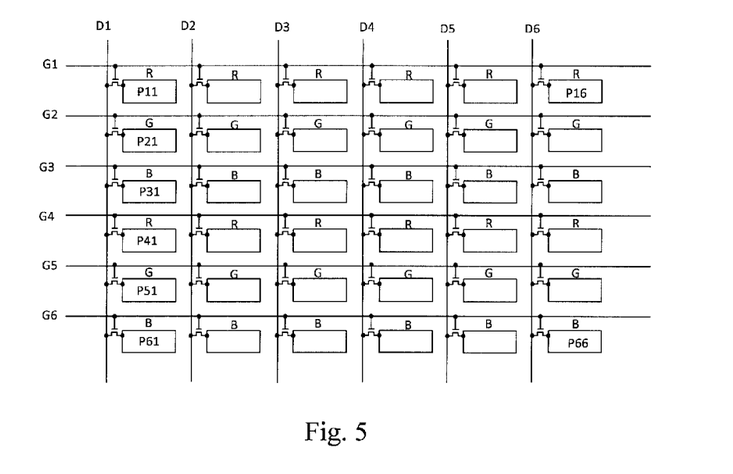

FIG. 5 schematically shows a structure of a tri-gate liquid crystal display panel according to an example of the present disclosure. As shown in FIG. 5, the display panel comprises a pixel array formed by a plurality of data lines (data lines D1-D6 as shown in FIG. 5) and a plurality of scan lines (scan lines G1-G6 as shown in FIG. 5) perpendicular to each other, and a plurality of sub pixels P11 to P66 disposed in the pixel array. A pixel unit is formed by a red sub pixel (R) P11, a green sub pixel (G) P21, and a blue sub pixel (B) P31.

In the case of a resolution ratio of n*m, the number of scan lines on the tri-gate liquid crystal display panel is 3 m and the number of data lines thereon is n, while the number of scan lines on a regular display panel is m and the number of data lines thereon is 3n. In other words, as compared with a regular display panel, under the condition of the same resolution ratio, the number of scan lines on the tri-gate liquid crystal display panel is triple the number of scan lines on the regular display panel, and the number of data lines on the tri-gate liquid crystal display panel is one third the number of data lines on the regular display panel. That is, more gate drive chips and less source drive chips are used in the tri-gate liquid crystal display panel, and thus the production cost and power consumption thereof can be reduced.

In a same frame period, the brightness displayed by the sub pixels on the liquid crystal display panel according to the present example is not uniform. Bright lines and dark lines along the horizontal direction are generated over the entire tri-gate pixel array for the following reasons.

Figure 6:
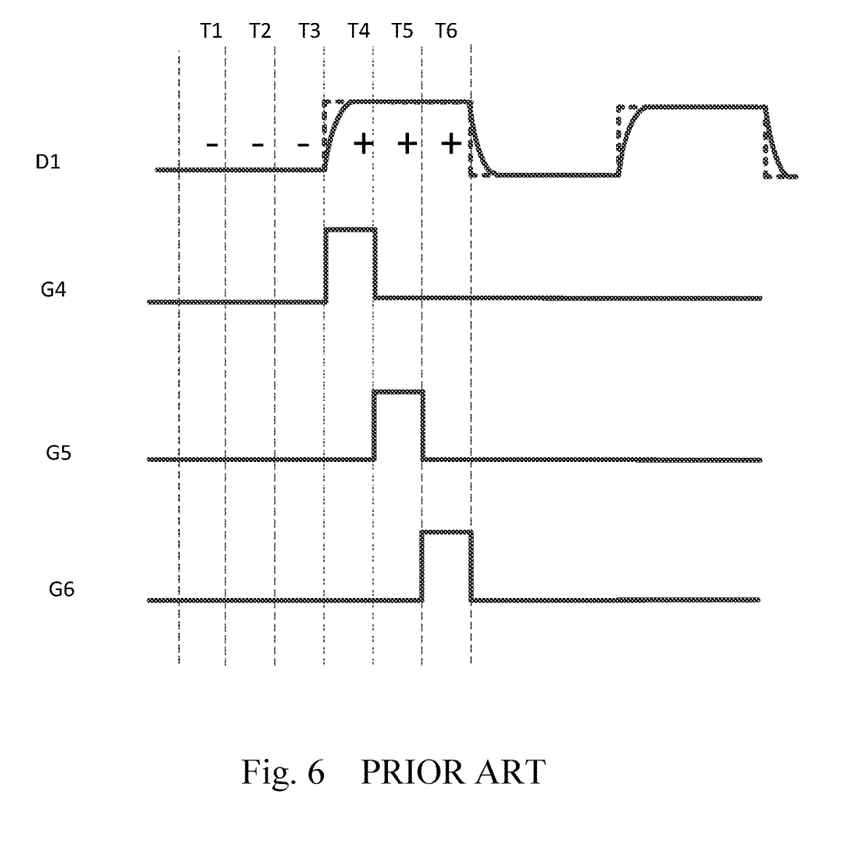
FIG. 6 shows a voltage oscillogram of drive signals of a scan line and a data line on a tri-gate panel in the prior art.

The voltage waveforms of the drive signals of the data line and the scan line in a frame are as shown in FIG. 6. The drive signal of a data line D1 inverses periodically. In the present example, a first time period after the polarity inversion is a scanning period T4, a second time period thereafter is a scanning period T5, and a further second period is a scanning period T6. According to the present example, the data line D1 is used for driving a first sub pixel P41, a second sub pixel P51, and a further second sub pixel P61. During the scanning period T4, a first scan line G4 is enabled, and the sub pixel P41 is charged with a data signal of positive polarity through the data line D1. During the scanning period T5, a second scan line G5 is enabled, and the sub pixel P51 is charged with a data signal of positive polarity through the data line D1. Similarly, during the scanning period T6, the further second scan line G6 is enabled, and the sub pixel P61 is charged through the data line D1. As compared with a regular display panel, the charging time of a sub pixel is reduced by two thirds, rendering the sub pixel undercharged by the data line.

As shown by the dashed line in FIG. 6, due to an RC delay of the data line D1, during a time period at the beginning of the scanning period T4, the drive signal of the data line D1 cannot reach a predetermined charging level, rendering the sub pixel P41 undercharged and to display relatively low brightness. However, during the scanning period T4 and the scanning period T5, the drive signal of the data line D1 reaches the predetermined charging level, and thus the sub pixels P51 and P61 are fully charged, thereby presenting relatively high brightness.

Furthermore, the tri-gate pixel array uses a 3H inversion driving mode, i.e., a three-line inversion driving mode. The data drive signal level experiences one polarity inversion within three scanning periods, i.e., the inversion period of the drive signal level of the data line is three scanning periods. As shown in FIG. 6, at the beginning of the scanning period T4, the drive signal level of the data line D1 experiences a polarity inversion, and jumps from a low level in the scanning period T3 to a high level in the scanning period T4. Because the drive signal of the data line D1 requires a significant change of voltage, the drive signal of the data line D1 cannot reach the predetermined charging level within a time period at the beginning of the scanning period T4, rendering the sub pixel P41 undercharged. On the contrary, at the beginning of each of the scanning period T5 and the scanning period T6, the drive signal level of the data line D1 would not inverse. Thus, during the scanning period T5 and scanning period T6, the drive signal of data line D1 can be kept at a stable predetermined charging level, thereby the sub pixels P51 and P61 can be fully charged.

Figure 7:
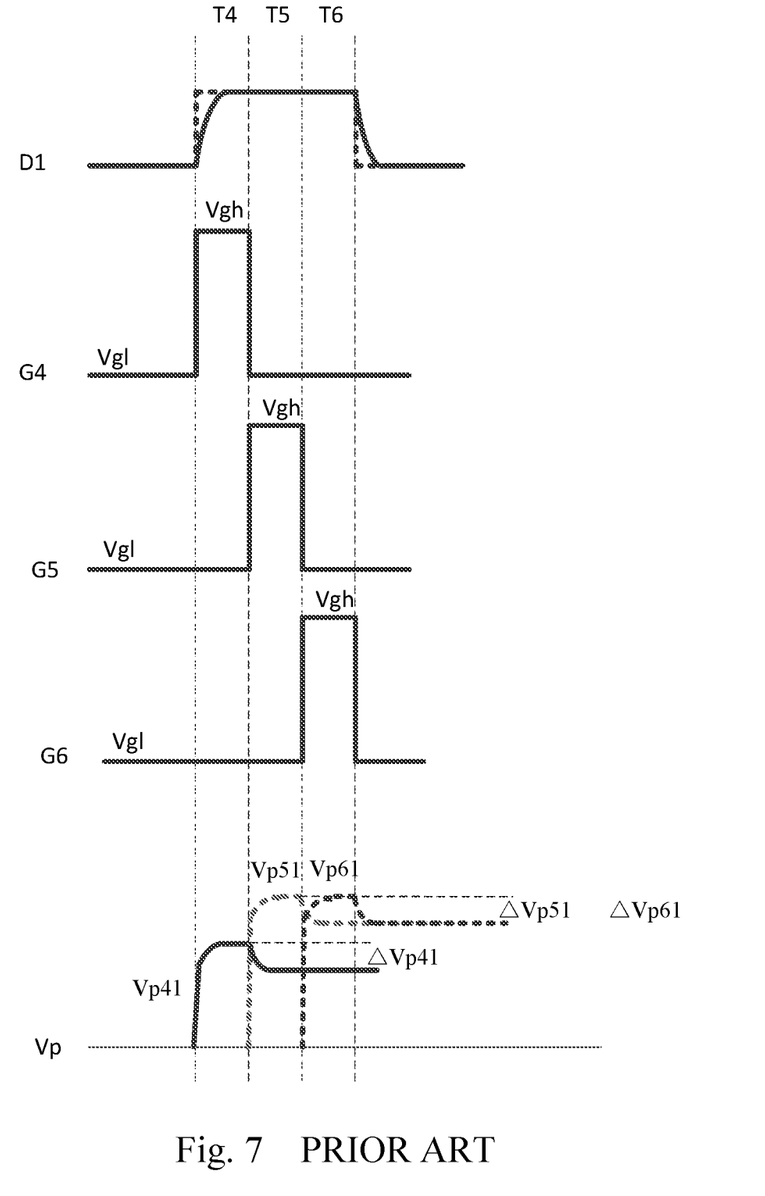
FIG. 7 shows an oscillogram illustrating changes of a pixel electrode voltage of a sub pixel on the tri-gate panel in the prior art.

In addition, similar to example 1, due to the influence of the feed through voltage caused by parasitic capacitance, the waveform changes of the pixel voltages respectively of sub pixels P41, P51 and P61 are as shown in FIG. 7.

At the beginning of the scanning period T4, the scan line G4 is enabled, and the drive signal level of the data line D1 cannot reach the predetermined charging level, and thus the charging rate of the data line D1 to the sub pixel P41 is relatively low. When the scanning period T4 ends, a pixel voltage Vp41 of the sub pixel P41 reaches the maximum value. After the scan line G4 is disenabled, a feed through voltage $\Delta Vp41$ enables the pixel voltage Vp41 to gradually decrease to a stable sustaining voltage.

At the beginning of the scanning period T5, the scan line G5 is enabled, and the drive signal of the data line D1 is kept at a stable predetermined charging level, and thus the charging rate of the data line D1 to the sub pixel P41 is relatively high. When the scanning period T5 ends, a pixel voltage Vp51 of the sub pixel P51 reaches the maximum value, which is greater than that of the pixel voltage Vp41 of the sub pixel P41. After the scan line G5 is disenabled, a feed through voltage $\Delta Vp51$ enables the pixel voltage Vp51 to gradually decrease to a stable sustaining voltage.

Similarly, at the beginning of the scanning period T6, the scan line G6 is enabled, and the charging rate of the data line D1 to the sub pixel P61 is relatively high. After the scan line G6 is disenabled, a feed through voltage $\Delta Vp61$ enables the pixel voltage Vp61 to gradually decrease to a stable sustaining voltage.

Since the drive signal levels respectively of scan lines G4, G5 and G6 are completely the same in the same frame period, i.e., $\Delta Vp41 = \Delta Vp51 = \Delta Vp61$, the sustaining voltage Vp41 obtained by sub pixel P41 is lower than the value of each of the sustaining voltages obtained by sub pixels P51 and P61. In this case, the brightness of the sub pixel P41 is relatively low and that of each of the sub pixels P51 and P61 is relatively high.

Based on the above analysis, according to the present example, the difference of charging rates of the data line to the sub pixels can be compensated through configuring different RC delays for the scan lines.

Reference can be made to FIG. 5, again. The RC delay of each of the second scan lines G5 and G6 can be larger than that of the first scan line G4. Specifically, when the thickness of each of the scan lines G5 and G6 is the same as that of the scan line G4, the width of each of the scan lines G5 and G6 can be made smaller than that of the scan line G4, so that the wiring resistance of each of the scan lines G5 and G6 is larger than that of the scan line G4.

Figure 8:
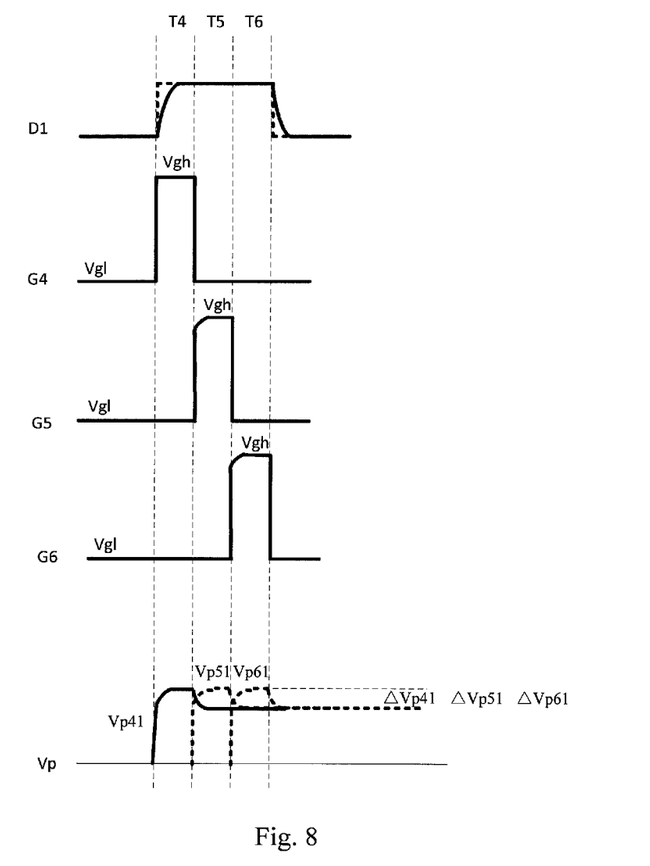
FIG. 8 shows an oscillogram indicating changes of a pixel electrode voltage of a sub pixel after compensation by an RC delay of the scan line according to example 2 of the present disclosure.

In this case, the waveform changes of the pixel electrode voltages of the sub pixels P41, P51 and P61 are as shown in FIG. 8.

At the beginning of the scanning period T4, the drive signal of the data line D1 cannot reach the predetermined charging level, and thus the charging rate of the data line D1 to the sub pixel P41 is relatively low. When the scanning period T4 ends, the pixel voltage Vp41 of the sub pixel P41 reaches the maximum value. After the scan line G4 is disenabled, the feed through voltage ΔVp41 enables the pixel voltage Vp41 to gradually decrease to a stable sustaining voltage.

As shown in FIG. 8, the polarity of the drive signal of the data line D1 is the same in the scanning period T4 as in the scanning period T5. At the beginning of the scanning period T5, the drive signal of the data line D1 is kept at a stable predetermined charging level. Since the RC delay of the scan line G5 is larger than that of the scan line G4, the scan line G5 cannot be completely enabled. As a result, the maximum value Vgh of the scanning drive signal level actually exerted on the sub pixel P51 is smaller than the predetermined charging level, rendering relatively low charging rate of the data line D1 to the sub pixel P51. When the scanning period T5 ends, the pixel voltage Vp51 of the sub pixel P51 reaches the maximum value.

It should be noted that the scanning periods T4, T5 and T6 have the same time span, i.e., the enabled time of the scan line G4 is the same as that of each of the scan lines G5 and G6. In addition, the value of the drive signal provided by the scan line G4 is the same as that of the drive signal provided by each of the scan lines G5 and G6. Therefore, according to the present example, better compatibility with the drive chip in the prior art can be achieved without the necessity to change the driving mode for the gate drive chip and the source drive chip of the tri-gate liquid crystal display device in the prior art.

According to the present example, the RC delay of each of the scan lines G5 and G6 is increased, so that the difference of charging rates of the data line D1 to the sub pixels P41, P51 and P61 can be compensated, thereby the charging rates of sub pixels P41, P51 and P61 can be the same. In other words, at the moment the scan line G5 is disenabled, the maximum value of the pixel voltage Vp51 of sub pixel P51 is the same as that of the pixel voltage Vp41 of the sub pixel P41, and at the moment the scan line G6 is disenabled, the maximum value of the pixel voltage Vp61 of the sub pixel P61 is the same as that of the pixel voltage Vp41 of the sub pixel P41.

After the scan line G5 is disenabled, the feed through voltage ΔVp51 enables the pixel voltage Vp51 to decrease to a stable voltage value. Similarly, after the scan line G6 is disenabled, the feed through voltage ΔVp61 enables the pixel voltage Vp61 to decrease to a stable voltage value.

Moreover, the values of the drive signal levels respectively provided by the scan lines G4, G5, and G6 are the same, that is, the enabling levels Vgh provided by G4, G5, and G6 have the same value. The disenabling levels Vgl provided by scan lines G4, G5, and G6 also have the same value. In this case, the level difference Vgh−Vgl causing the feed through voltage at the time when the scan line G5 is disenabled is completely the same as that at the time when the scan line G4 is disenabled, so that the feed through voltage ΔVp51 equals to the feed through voltage ΔVp41. In this case, the sustaining voltage obtained by the sub pixel P51 and that obtained by the sub pixel P41 have the same value, thereby the sub pixel P51 and the sub pixel P41 can display the same brightness at last. Similarly, the feed through voltage ΔVp61 equals to ΔVp41, thereby the sub pixel P61 and the sub pixel P41 can display the same brightness at last.

It should be noted that the difference of RC delay of each of the second scan lines G5 and G6 from the first scan line G4 can be configured on account of the abovementioned two factors causing the bright lines and dark lines.

That is, the relatively large RC delay of each of the scan lines G5 and G6 is used for compensating the difference of charging rates of the sub pixels caused by the RC delay of the data line D1, and the difference of charging rates of the sub pixels caused by the 3H inversion drive mode.

In addition, according to the present example, by configuring reasonable difference of RC delay of each of the scan lines G5 and G6 from that of the scan line G4, the high level Vgh of the scanning drive signal actually provided to the sub pixels at the time when each of the scan lines G5 and G6 is disenabled is the same as that at the time when the scan line G4 is disenabled, thereby the feed through voltages ΔVp41, ΔVp51, and ΔVp61 are the same.

Thus, it should be easy for one skilled in the art to understand that in a tri-gate liquid crystal display panel, the wiring width of a $(3k+1)^{th}$ scan line and that of a $(3k+2)^{th}$ scan line each can be different from that of a $3k^{th}$ scan line, so that the difference of charging rates of the data line to the sub pixels can be compensated (k is an integer, k≥0). As a result, the final charging voltage of the sub pixels in each of the lines tend to be consistent, thereby the bright lines and dark lines along the horizontal direction can be eliminated.

Furthermore, the 3H inversion drive mode can also be applied to the HSD liquid crystal display panel according to example 1, as well as to a regular liquid crystal display panel. Under such drive mode, the wiring width of a $(3k+1)^{th}$ scan line and that of a $(3k+2)^{th}$ scan line each can be different from that of a $3k^{th}$ scan line, so that the difference of charging rates of the sub pixels can be compensated, thereby the defect of uneven brightness can be eliminated.

The above embodiments are described only for better understanding the present disclosure. The 2H inversion drive mode and the 3H inversion drive mode described in the above embodiments are not used to limit the present disclosure. Other inversion drive mode can also be applied to the present disclosure. Any person skilled in the art can make amendments to the implementing forms or details without departing from the spirit and scope of the present disclosure. The scope of the present disclosure should still be subjected to the scope defined in the claims.

The invention claimed is:

1. A liquid crystal display panel, comprising
a plurality of sub pixels arranged in a pixel array, which is formed by a plurality of data lines and a plurality of scan lines that are perpendicular with respect to each other,
wherein a data line is configured to drive a first sub pixel and at least one second sub pixel, and a drive signal level of the data line inverses periodically;
wherein the plurality of scan lines comprises:
a first scan line connected with the first sub pixel, the first scan line being enabled within a first time period after a polarity inversion of the drive signal level of the data line, so as to charge the first sub pixel through the data line,
at least one second scan line connected with the at least one second sub pixel, the second scan line being enabled within a second time period after the first time period, so as to charge the second sub pixel through the data line, wherein a polarity of the drive signal level of the data line in the first time period is identical with in the second time period, and an RC delay of the second scan line is configured to be larger than that of the first scan line, so that charging rates of the data line to the sub pixels are equal and sustaining voltages obtained by the sub pixels after being charged are identical;

if the pixel array is a half source driving pixel array, for a row of the sub pixels, the first scan line and the second scan line are disposed above and below, respectively, wherein the first scan line is connected with the first sub pixel and the second scan line is connected with the second sub pixel in the row of the sub pixels;

if the pixel array is a tri-gate pixel array, for a column of the sub pixels, the first scan line, the second scan line and another scan line from a top to a bottom of the column of the sub pixels are connected with the first sub pixel and the second sub pixel and another second sub pixel in the column of sub pixels, respectively.

2. The liquid crystal display panel according to claim 1, wherein a wiring resistance of the second scan line is larger than that of the first scan line.

3. The liquid crystal display panel according to claim 1, wherein a thickness of the second scan line is identical with that of the first scan line, and a width of the second scan line is smaller than that of the first scan line.

4. The liquid crystal display panel according to claim 1, wherein one second scan line is provided, and an inversion period of the drive signal level of the data line equals to two scanning periods.

5. The liquid crystal display panel according to claim 1, wherein two second scan lines are provided, and an inversion period of the drive signal level of the data line equals to three scanning periods.

6. The liquid crystal display panel according to claim 1, wherein the first time period and the second time period after the polarity inversion of the drive signal level of the data line both have an equal time span, and an enabled time of the first scan line is identical with that of the at least one second scan line.

7. The liquid crystal display panel according to claim 1, wherein a value of the drive signal level of the second scan line is identical with that of the drive signal level of the first scan line, so that a feed-through voltage of the first sub pixel is identical with that of the at least one second sub pixel.

* * * * *